US012747842B2

(12) United States Patent
Van Os et al.

(10) Patent No.: US 12,747,842 B2
(45) Date of Patent: Sep. 29, 2026

(54) ARTIFICIAL SKYLIGHT DEVICE WITH A PANEL AND RIM WHERE EACH EMIT LIGHT THAT RESPECTIVELY RESEMBLES THE SKY AND SUNLIGHT

(71) Applicant: SIGNIFY HOLDING B.V., Eindhoven (NL)

(72) Inventors: Jacobus Petrus Johannes Van Os, Eindhoven (NL); Paul Philip Thursfield, Eindhoven (NL); Thomas Van De Moosdijk, Eindhoven (NL); Marcus Cornelis Van Meel, Helmond (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 19/144,626

(22) PCT Filed: Dec. 19, 2023

(86) PCT No.: PCT/EP2023/086676
§ 371 (c)(1),
(2) Date: Jun. 30, 2025

(87) PCT Pub. No.: WO2024/146782
PCT Pub. Date: Jul. 11, 2024

(65) Prior Publication Data

US 2026/0218868 A1 Jul. 30, 2026

(30) Foreign Application Priority Data

Jan. 2, 2023 (EP) .................................... 23150005

(51) Int. Cl.
*F21S 8/06* (2006.01)
*F21V 3/02* (2006.01)
(Continued)

(52) U.S. Cl.
CPC .................. *F21S 8/06* (2013.01); *F21V 3/02* (2013.01); *F21Y 2107/90* (2016.08); *F21Y 2113/10* (2016.08)

(58) Field of Classification Search
CPC ........... F21V 9/02; F21S 8/06; F21Y 2113/10; F21Y 2107/90
See application file for complete search history.

(56) References Cited

U.S. PATENT DOCUMENTS 10,451,229 B2 * 10/2019 Keller .................. F21V 23/003
10,508,793 B2 * 12/2019 Flynn ....................... F21V 9/02
(Continued)

FOREIGN PATENT DOCUMENTS

JP 2021026793 A 2/2021
KR 20110008691 U 9/2011
(Continued)

*Primary Examiner* — Robert J May

(57) ABSTRACT

The present invention provides a suspensible artificial skylight (1) for providing artificial skylight light, the artificial skylight (1) comprising: a panel (2) comprising a first light emitting surface (2*a*) arranged to emit first light for resembling the sky; a rim (3) circumscribing the first light emitting surface (2*a*), the rim having an inner wall (4) facing towards the first light emitting surface (2*a*), and an outer wall (5) facing away from the first light emitting surface (2*a*); the rim (3) having a proximal end (6) arranged adjacent to the first light emitting surface (2*a*), and a distal end (7) arranged remote from the first light emitting surface (2*a*); wherein at least a first portion of the inner wall (4) of the rim (3) comprises a second light emitting surface (8) configured to emit a second light for resembling the sun light; and wherein at least a portion of the outer wall (5) of the rim (3) comprises a third light emitting surface (9) configured to emit a third light.

15 Claims, 1 Drawing Sheet

(51) Int. Cl.

| | |
|---|---|
| *F21Y 107/90* | (2016.01) |
| *F21Y 113/10* | (2016.01) |

(56) References Cited

U.S. PATENT DOCUMENTS

| | | | | |
|---|---|---|---|---|
| 12,078,342 | B2 * | 9/2024 | Snell | F21S 8/024 |
| 2017/0205052 | A1 | 7/2017 | Mastenbroek et al. | |
| 2019/0277475 | A1 | 9/2019 | Hikmet et al. | |
| 2024/0003518 | A1 * | 1/2024 | Pickard | F21V 13/02 |
| 2026/0098618 | A1 * | 4/2026 | Wang | F21S 8/03 |

FOREIGN PATENT DOCUMENTS

| | | | |
|---|---|---|---|
| WO | 2021136716 | A1 | 7/2021 |
| WO | 2022020571 | A1 | 1/2022 |

* cited by examiner

ARTIFICIAL SKYLIGHT DEVICE WITH A PANEL AND RIM WHERE EACH EMIT LIGHT THAT RESPECTIVELY RESEMBLES THE SKY AND SUNLIGHT

CROSS-REFERENCE TO PRIOR APPLICATIONS

This application is the U.S. National Phase application under 35 U.S.C. § 371 of International Application No. PCT/EP2023/086676, filed on Dec. 19, 2023, which claims the benefit of European Patent Application No. 23150005.9, filed on Jan. 2, 2023. These applications are hereby incorporated by reference herein.

TECHNICAL FIELD

The present invention is related to an artificial skylight for obtaining an artificial skylight/daylight or a natural window appearance.

BACKGROUND

Artificial skylights provide emulation of at least certain aspects of an outdoor environment in an indoor environment. The demand for artificial skylights is increasing due to its beneficial properties for human wellbeing. Since people tend to spend a majority of their day indoors, which may remove them from natural daylight, there is an interest in creating artificial light, which may simulate the appearance and light of a natural window or skylight.

Currently available artificial skylights combine multi-controlled coloured LED sources into one luminaire in order to mimic outdoor experience in office or home environments. This concept combines these LED light sources in a 3D printed envelope with specific characteristics. The current products fit very well in a rectangular office ceiling grid. However, they are not intended for other ways of application like suspension. Further, the current products are usually made in a conventional way of luminaire manufacturing, including bending and coating of metal sheets, screwing and wiring. Therefore, currently available products suffer from the disadvantage of poor scalability and rather high manufacturing costs.

Thus, there is a need to provide improved artificial skylights offering scalability and low manufacturing costs while maintaining the natural appearance.

SUMMARY

In view of the above discussion, an object of the present invention is to provide such an improved artificial skylight. The artificial skylight for providing artificial skylight light according to the present invention thus comprises a panel comprising a first light emitting surface arranged to emit first light for resembling the sky. The first light emitting surface may be rectangular, square, circular, rhombic or oval. Further, the first light-emitting surface may be flat or curved. The first light may have a dominant peak wavelength in the wavelength range from 430 nm to 490 nm. The panel may comprise a plurality of first light emitting elements, optionally arranged at its first light emitting surface. The term "light emitting elements", it intended to mean "comprising light emitting diodes (LEDs), a plurality of LEDs, and/or a plurality of LEDs arranged in a linear array". Further, by the term "light emitting elements" it is meant a dense packing of LEDs. The dense packing of LEDs may be along the longitudinal axis of the artificial skylight. The panel may be a display module, an LCD/Matrix or the like.

The first light emitting surface may have length L and a width W. L may be in a range from 0.3 m to 2 m, preferably in a range from 0.4 m to 1.8 m, more preferably in a range from 0.5 m to 1.5 m, most preferably 0.6 m to 1.2 m. W may be in a range from 0.3 m to 2 m, preferably in a range from 0.4 m to 1.8 m, more preferably in a range from 0.5 m to 1.5 m, most preferably 0.6 m to 1.2 m. Preferably L is equal to W.

Each or any of the LEDs may comprise inorganic LED(s) and/or organic LED(s) (OLEDs). While reference is made herein to the light emitting elements as comprising LEDs, it is to be understood that each or any of the light emitting elements, in alternative or in addition to a LED, could comprise another or other types of light sources, such as another or other types of solid state light emitters. The light emitting elements may be arranged along (substantially) the entire surface of the light emitting surface of the artificial skylight.

The artificial skylight according to the present invention further comprises a rim circumscribing the first light emitting surface, the rim having an inner wall facing towards the first light emitting surface, and an outer wall facing away from the first light emitting surface. The rim has a proximal end arranged adjacent to the first light emitting surface, and a distal end arranged remote from the first light emitting surface.

At least a portion of the inner wall of the rim comprises a second light emitting surface configured to emit a second light for resembling the sun light. Preferably, the entire inner wall of the rim comprises the second light emitting surface.

The first light emitting surface may be arranged substantially perpendicularly to the second light emitting surface. By the term "substantially perpendicularly" is understood as being arranged at an angle of 85° to 95°. The second light emitting surface may comprise a plurality of second light emitting elements.

At least a portion of the outer wall of the rim comprises a third light emitting surface configured to emit a third light. The third light emitting surface may comprise a plurality of third light emitting elements. Preferably, the entire outer wall of the rim comprises the third light emitting surface.

The portion of the inner wall of the rim comprising the second light emitting surface may be in a range from 5% to 95%, preferably in a range from 15% to 85%, more preferably in a range from 20% to 80%, most preferably in a range from 30% to 70%, such as for example 65% of the total inner surface area of the rim.

The portion of the outer wall of the rim comprising the third light emitting surface may be in a range from 5% to 95%, preferably in a range from 15% to 85%, more preferably in a range from 20% to 80%, most preferably in a range from 30% to 70%, such as for example 65% of the total outer surface area of the rim.

At least a portion of the rim may be 3D printed. 3D printing may be done using any 3D printing technique, such as fused deposition modelling (FDM) or the like. Preferably, the outer wall of the rim is 3D printed. The rim may comprise polymeric materials such as polycarbonate (PC), polyethylene terephthalate (PET), polypropene (PP), polylactic acid (PLA).

In order to improve versatility of the artificial skylight according to the present invention, the first light emitting surface, the second light emitting surface and the third light emitting surface may be individually controllable. Further, color and/or intensity of the second light and/or the third light may be non-constant along the inner and/or the outer wall of the rim. The first, second and/or third light emitting surface may be backlit and/or sidelit.

The artificial skylight may further comprise a light exit window panel arranged downstream from the first light emitting surface, wherein the light exit window panel is configured to allow at least a portion of the first light to exit the artificial skylight. The light exit window panel is preferably transparent and is used for providing an infinite effect to the artificial skylight. Preferably, an air gap is formed between the light exit window panel and the first light emitting surface.

The rim of the artificial skylight may further comprise a bezel arranged between and parallel to the inner and the outer walls of the rim, the bezel having a first surface facing the inner wall of the rim, and a second surface facing the outer wall of the rim. In an embodiment where a bezel is present, the second light sources may be arranged on the first surface of the bezel, and the third light sources may be arranged on the second surface of the bezel. The bezel has a proximal end arranged adjacent to the first light emitting surface, and a distal end arranged at a distance from the proximal end. The bezel may be 3D printed and may comprise glass and/or metal.

The bezel may comprise a supporting portion arranged adjacent to the distal end of the bezel, i.e. at a distance from and substantially parallel to the first light emitting surface. The supporting portion of the bezel is arranged adjacent to the distal end of the rim, wherein the supporting portion has an inner edge arranged adjacent to the inner wall of the rim, and an outer edge adjacent to the outer wall of the rim. The distal end of the outer wall of the rim may comprise a flat portion abutting the supporting portion of the bezel. Such an embodiment offers the advantage of preventing light leakage from the gap formed between the bezel and the outer wall of the rim.

The proximal end of the inner wall of the rim may comprise a flat portion abutting the first light emitting surface, or, if present, the light exit window panel. According to such an embodiment, light leakage from the gap between the bezel and the inner wall of the rim is minimized or eliminated.

In particular, the panel comprising the first light emitting surface may be circular and may have a first diameter D1. The bezel may also be circular and may have a second diameter D2 defined by the inner edge of the supporting portion of the bezel. The first diameter D1 may be greater than the second diameter D2, D2<D1. In such an embodiment, the challenge arises when the panel comprising the first light emitting surface is mounted into the bezel, since insertion of the panel into the bezel from the distal end thereof is not feasible. The panel may be introduced from the proximal end of the bezel by being inserted at an angle through a dedicated notch in the proximal end of the bezel, and then arranged substantially perpendicularly relative the first surface of the bezel. Alternatively, the panel may have a truncated shape, e.g. a truncated circular shape, which enables insertion of the panel into the bezel. Another option is to reversibly deform the proximal end of the bezel, such that the panel may be inserted.

The inner wall of the rim may be an inner diffuser. The inner diffuser may be cone-shaped and may thus be arranged at an angle α relative to the first light emitting surface. The angle α may be from 30° to 150°, such as 75° to 120°. A masking element may be arranged between the outer and the inner wall of the rim. Preferably, the masking element abuts the inner wall of the rim. Such a masking element covers a portion of the inner wall of the rim and provides a shadow effect. The masking element is preferably made of light blocking material.

The outer wall of the rim may be in the form of an outer diffuser and may comprise a vertical portion and a horizontal portion. The horizontal portion may be adjacent to the distal end of the rim and offers the advantage of preventing light leakage from the gap formed between the bezel and the outer diffuser. It is noteworthy that the term "horizontal" and "vertical" as used herein are understood to correspond to the conventional meaning of these terms when the artificial skylight is suspended from the ceiling or another horizontal surface. However, should the artificial skylight be attached to a wall or to another vertical surface, the terms "horizontal" and "vertical" will be interchanged.

The vertical portion of the outer diffuser may be convex. In particular, the vertical portion of the outer diffuser may be ribbed.

The artificial skylight according to the present invention may comprise a suspending element arranged for suspending the artificial skylight. The suspending element may be a wire, a chain, a rope or the like.

As is understood from the above, the present invention provides an artificial skylight having improved appearance and being suspensible.

Finally, the present invention relates to a method for manufacturing a suspensible artificial skylight. The method comprises the steps of:

a) providing a panel having a first light emitting surface arranged to emit first light for resembling the sky;
b) providing a rim having an inner wall and an outer wall, the rim having a proximal end and a distal end, wherein at least a first portion of the inner wall of the rim comprises a second light emitting surface configured to emit a second light for resembling the sun light, and wherein at least a portion of the outer wall of the rim comprises a third light emitting surface configured to emit a third light;
c) arranging the first light emitting surface in the rim such that the rim circumscribes the first light emitting surface, such that the inner wall of the rim faces towards the first light emitting surface, and the outer wall of the rim faces away from the first light emitting surface; and such that the proximal end of the rim is arranged adjacent to the first light emitting surface, and the distal end of the rim is arranged remote from the first light emitting surface.

BRIEF DESCRIPTION OF THE DRAWINGS

Exemplifying embodiments of the invention will be described below with reference to the accompanying drawings.

Figure 1:
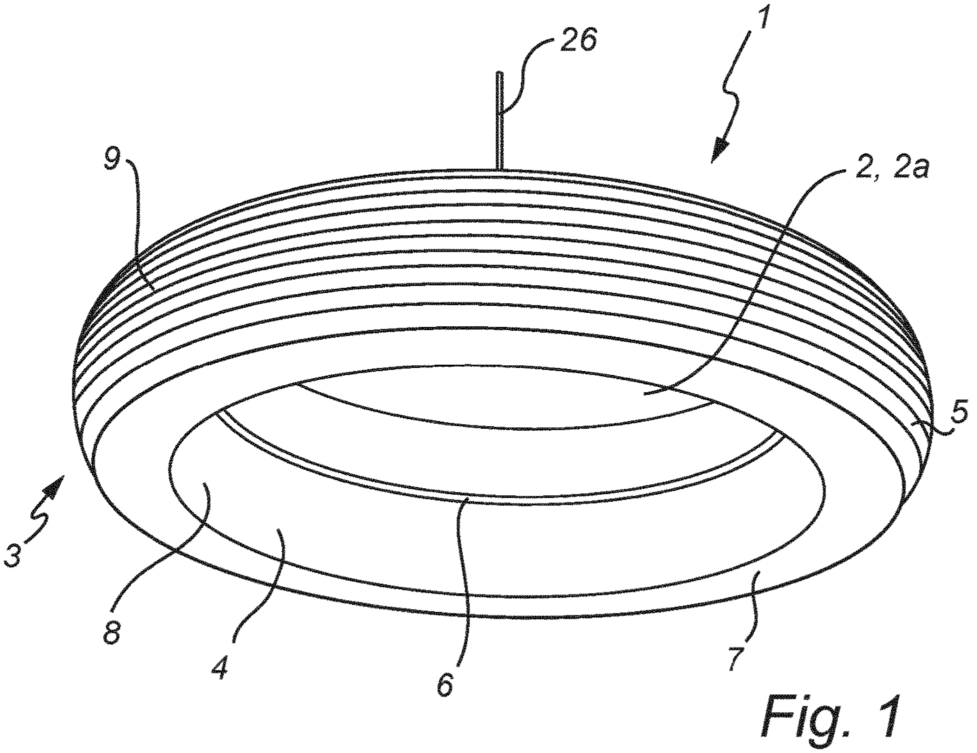
FIG. 1 depicts a perspective view of artificial skylight according to the present invention.

All the figures are schematic, not necessarily to scale, and generally only show parts which are necessary in order to elucidate embodiments of the present invention, wherein other parts may be omitted or merely suggested.

DETAILED DESCRIPTION

The present invention will now be described hereinafter with reference to the accompanying drawings, in which exemplifying embodiments of the present invention are shown. The present invention may, however, be embodied in many different forms and should not be construed as limited to the embodiments of the present invention set forth herein; rather, these embodiments of the present invention are provided by way of example so that this disclosure will convey the scope of the invention to those skilled in the art. In the drawings, identical reference numerals denote the same or similar components having a same or similar function, unless specifically stated otherwise.

FIG. 1 illustrates a perspective view of the artificial skylight 1 according to the present invention. The artificial skylight comprises a panel 2 comprising first light emitting surface 2*a* arranged to emit first light for resembling the sky. The first light emitting surface 2*a* is circular. Further, the first light-emitting surface 2*a* is flat. The first light may have a dominant peak wavelength in the wavelength range from 430 nm to 490 nm, i.e. the first light is blue light.

The artificial skylight 1 comprises a rim 3 circumscribing the first light emitting surface 2*a*. The rim 3 has an inner wall 4 facing towards the first light emitting surface 2*a*, and an outer wall 5 facing away from the first light emitting surface 2*a*. The rim 3 has a proximal end 6 arranged adjacent to the first light emitting surface 2*a*, and a distal end 7 arranged remote from the first light emitting surface 2*a*.

The inner wall 4 of the rim 3 comprises a second light emitting surface 8 configured to emit a second light for resembling the sun light. The first light emitting surface 2*a* is arranged substantially perpendicularly to the second light emitting surface 8.

The outer wall 5 of the rim 3 comprises a third light emitting surface 9 configured to emit a third light.

As mentioned above, in order to improve versatility of the artificial skylight according to the present invention, the first light emitting surface 2*a*, the second light emitting surface 8 and the third light emitting surface 9 may be individually controllable. Further, color and/or intensity of the second light and/or the third light may be non-constant along the inner and/or the outer wall 4, 5 of the rims 3.

Figure 2:
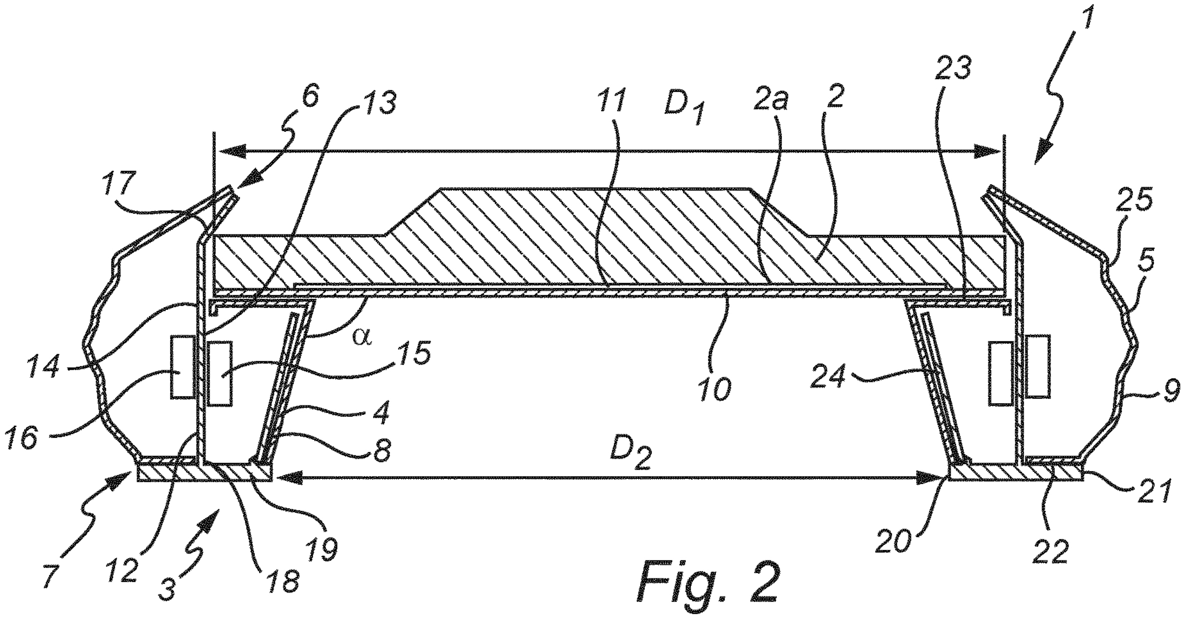
FIG. 2 illustrates a cross-section of the artificial skylight depicted in FIG. 1.

Turning the attention to FIG. 2, the artificial skylight 1 further comprise a light exit window panel 10 arranged downstream from the first light emitting surface 2*a*, wherein the light exit window panel 10 is configured to allow at least a portion of the first light to exit the artificial skylight 1. The light exit window panel is preferably transparent and is used for providing an infinite effect to the artificial skylight. An air gap 11 is formed between the light exit window panel 10 and the first light emitting surface 2*a*.

The rim 3 of the artificial skylight 1 further comprises a bezel 12 arranged between and parallel to the inner 4 and the outer walls 5 of the rim 3. The bezel has a first surface 13 facing the inner wall 4 of the rim 3, and a second surface 14 facing the outer wall 5 of the rim 3. The second light sources 15 is arranged on the first surface 13 of the bezel 12, and the third light sources 16 are arranged on the second surface 14 of the bezel 12. The bezel 12 has a proximal end 17 arranged adjacent to the first light emitting surface 2*a*, and a distal end 18 arranged at a distance from the proximal end 17.

The bezel 12 comprise a supporting portion 19 arranged adjacent to the distal end 18 of the bezel 12, i.e. at a distance from and substantially parallel to the first light emitting surface 2*a*. The supporting portion 19 of the bezel 12 is arranged adjacent to the distal end 7 of the rim 3, wherein the supporting portion 19 has an inner edge 20 arranged adjacent to the inner wall 4 of the rim 3, and an outer edge 21 arranged adjacent to the outer wall 5 of the rim 3. The distal end 7 of the outer wall 5 of the rim 3 comprise a vertical flat portion 22 abutting the supporting portion 19 of the bezel 12. Such an embodiment offers the advantage of preventing light leakage from the gap formed between the bezel 12 and the outer wall 5 of the rim 3.

The proximal end 6 of the inner wall 4 of the rim 3 comprises a flat portion 23 abutting the light exit window panel 10. According to such an embodiment, light leakage from the gap between the bezel 12 and the inner wall 4 of the rim 3 is minimized or eliminated.

In particular, the panel 2 comprising the first light emitting surface 2*a* is circular and has a first diameter D1. The bezel 12 is also circular and has a second diameter D2 defined by the inner edge 20 of the supporting portion 19 of the bezel 12. The first diameter D1 is greater than the second diameter D2, D2<D1.

As mentioned above, the inner wall 4 of the rim 3 may be an inner diffuser. The inner diffuser is cone-shaped and is thus arranged at an angle $\alpha$ relative to the first light emitting surface 2*a*, in the figure a is about 105°. A masking element 24 is arranged between the outer and the inner wall 5, 4 of the rims 3. In the embodiment shown in FIG. 2, the masking element 24 abuts the inner wall 4 of the rim 3. Such a masking element 24 covers a portion of the inner wall 4 of the rim 3 and provides a shadow effect.

The outer wall 5 of the rim 3 is in the form of an outer diffuser and comprises a vertical flat portion 22 and a horizontal portion 25. The horizontal portion 22 is adjacent to the distal end 7 of the rim 3 and offers the advantage of preventing light leakage from the gap formed between the bezel 12 and the outer diffuser 5.

The vertical portion 25 of the outer diffuser 5 is convex and ribbed.

The artificial skylight 1 according to the present invention comprises a suspending element 26 arranged for suspending the artificial skylight 1, as shown in FIG. 1. The suspending element 26 may be a wire, a chain, a rope or the like.

While the present invention has been illustrated in the appended drawings and the foregoing description, such illustration is to be considered illustrative or exemplifying and not restrictive; the present invention is not limited to the disclosed embodiments. Other variations to the disclosed embodiments can be understood and effected by those skilled in the art in practicing the claimed invention, from a study of the drawings, the disclosure, and the appended claims. In the appended claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A suspensible artificial skylight for providing artificial skylight light, said artificial skylight comprising:

a panel comprising a first light emitting surface arranged to emit first light for resembling the sky;

a rim circumscribing said first light emitting surface, said rim having an inner wall facing towards said first light emitting surface, and an outer wall facing away from said first light emitting surface;

said rim having a proximal end arranged adjacent to said first light emitting surface, and a distal end arranged remote from said first light emitting surface;

wherein at least a first portion of said inner wall of said rim comprises a second light emitting surface configured to emit a second light for resembling the sun light;

and wherein at least a portion of said outer wall of said rim comprises a third light emitting surface configured to emit a third light, and wherein said rim comprises a bezel arranged between said inner and said outer walls of said rim and substantially parallel to said inner and/or said outer walls of said rim, said bezel having a first surface facing said inner wall of said rim, and a second surface facing said outer wall of said rim.

2. The artificial skylight according to claim 1, wherein at least a portion of said rim is 3D printed.

3. The artificial skylight according to claim 1, wherein said first light emitting surface, said second light emitting surface and said third light emitting surface are individually controllable.

4. The artificial skylight according to claim 1, wherein color and/or intensity of said second light and/or said third light is non-constant along said inner and/or said outer wall of said rim.

5. The artificial skylight according to claim 1, wherein said artificial skylight further comprises a light exit window panel arranged downstream from said first light emitting surface, wherein said light exit window panel is configured to allow at least a portion of said first light to exit said artificial skylight.

6. The artificial skylight according to claim 1, wherein the proximal end of the inner wall of the rim comprises a flat portion abutting one of i) first light emitting surface and ii) a light exit window panel comprised in the artificial skylight and arranged downstream from said first light emitting surface.

7. The artificial skylight according to claim 1, wherein said first surface of said bezel comprises at least one second light source, and wherein said second surface of said bezel comprises at least one third light source.

8. The artificial skylight according to claim 1, wherein said bezel comprises a supporting portion arranged at a distance from and substantially parallel to said first light emitting surface, said supporting portion of said bezel being arranged adjacent to said distal end of said rim, wherein said supporting portion has an inner edge arranged adjacent to said inner wall of said rim, and an outer edge adjacent to said outer wall of said rim.

9. The artificial skylight according to claim 8, wherein said panel comprising said first light emitting surface is circular and has a first diameter D1, wherein said bezel is circular and has a second diameter D2 defined by said inner edge of said supporting portion of said bezel, and wherein D2<D1.

10. The artificial skylight according to claim 1, wherein said inner wall of said rim is an inner diffuser having an inner surface facing said outer wall, and an outer surface facing away from said outer wall, said inner diffuser being arranged at an angle $\alpha$ relative to said first light emitting surface, said inner diffuser further comprising a horizontal portion arranged adjacent to said proximal end of said rim and being parallel to said first light emitting surface.

11. The artificial skylight according to claim 10, wherein said artificial skylight further comprises a masking element arranged adjacent to said inner surface of said inner diffuser.

12. The artificial skylight according to any one of the preceding claim 1, wherein said outer wall of said rim is an outer diffuser comprising a vertical portion and a horizontal portion, said horizontal portion being adjacent to said distal end of said rim.

13. The artificial skylight according to claim 12, wherein said vertical portion of said outer diffuser is convex.

14. The artificial skylight according to claim 1, said artificial skylight further comprising a suspending element arranged for suspending said artificial skylight.

15. A method for manufacturing a suspensible artificial skylight, said method comprises the steps of:

a) providing a panel comprising a first light emitting surface arranged to emit first light for resembling the sky;

b) providing a rim having an inner wall and an outer wall, said rim having a proximal end and a distal end, wherein at least a first portion of said inner wall of said rim comprises a second light emitting surface configured to emit a second light for resembling the sun light, and wherein at least a portion of said outer wall of said rim comprises a third light emitting surface configured to emit a third light said rim further comprising a bezel arranged between said inner and said outer walls of said rim and substantially parallel to said inner and/or said outer walls of said rim;

c) arranging said panel with said first light emitting surface in said rim such that said rim circumscribes said first light emitting surface, such that said inner wall of said rim faces towards said first light emitting surface, and said outer wall of said rim faces away from said first light emitting surface; and such that said proximal end of said rim is arranged adjacent to said first light emitting surface, and said distal end of said rim is arranged remote from said first light emitting surface.

* * * * *